United States Patent [19]
Sherman

[11] Patent Number: 5,109,573
[45] Date of Patent: May 5, 1992

[54] BRAKE MECHANISM FOR A PIVOTABLE CHARACTER DISPLAY

[75] Inventor: Howard F. Sherman, McGraw, N.Y.

[73] Assignee: Smith Corona Corporation

[21] Appl. No.: 589,140

[22] Filed: Sep. 27, 1990

[51] Int. Cl.⁵ .................. E05C 17/64; E05D 11/08
[52] U.S. Cl. ............................... 16/341; 16/342
[58] Field of Search ..................... 16/337, 341, 342

[56] References Cited

U.S. PATENT DOCUMENTS

| | | | |
|---|---|---|---|
| 1,644,249 | 10/1927 | Harrison | 16/340 |
| 2,999,268 | 9/1961 | Strandengen | 16/332 |
| 4,287,641 | 9/1981 | MacDonald | 16/337 |
| 4,329,917 | 5/1982 | Fisher et al. | 16/337 |
| 4,571,456 | 2/1986 | Paulsen et al. | 179/2 C |
| 4,624,434 | 11/1986 | Lake, Jr. et al. | 248/454 |
| 4,730,364 | 3/1988 | Tat-Kee | 16/337 |
| 4,734,955 | 4/1988 | Connor | 16/341 |
| 4,781,422 | 11/1988 | Kimble | 16/337 |
| 4,790,504 | 12/1988 | Wills et al. | 248/183 |
| 4,808,017 | 2/1989 | Sherman et al. | 400/83 |
| 4,859,092 | 8/1989 | Makita | 400/83 |

FOREIGN PATENT DOCUMENTS

| | | | |
|---|---|---|---|
| 472975 | 4/1951 | Canada | 16/340 |
| 360584 | 11/1931 | United Kingdom | 16/342 |

OTHER PUBLICATIONS

Design News Magazine, dated Feb. 12, 1990, pp. 262 & 263, article "Constant-Torque Slip Clutch Supports Computer Screen", by Charles J. Murray.

Primary Examiner—Robert L. Spruill
Assistant Examiner—Carmine Cuda

[57] ABSTRACT

The teachings of the present invention include a brake mechanism for a continuously adjustable pivotable character display that does not cover the keyboard of the computer, personal word processor or typewriter, has a relatively small angle of movement and has a relatively short arm length. The brake mechanism comprises a brake pad mounted on the typewriter and a cam located on the pivotable character display such that the display is continuously pivotable between a down position and an upright position. The cam compresses the brake pad as the display is brought towards a down position and the frictional force between the cam and the brake pad is sufficient to hold the display in a desired position between the down position and the upright position. The brake mechanism may include an indentation in the housing of the typewriter such that the brake pad fits into the indentation snugly and is held in place by the walls of the indentation and the friction between the brake pad and the walls of the indentation. The brake pad may be capable of being removed and replaced. The cam may be shaped into the housing of the character display.

24 Claims, 4 Drawing Sheets

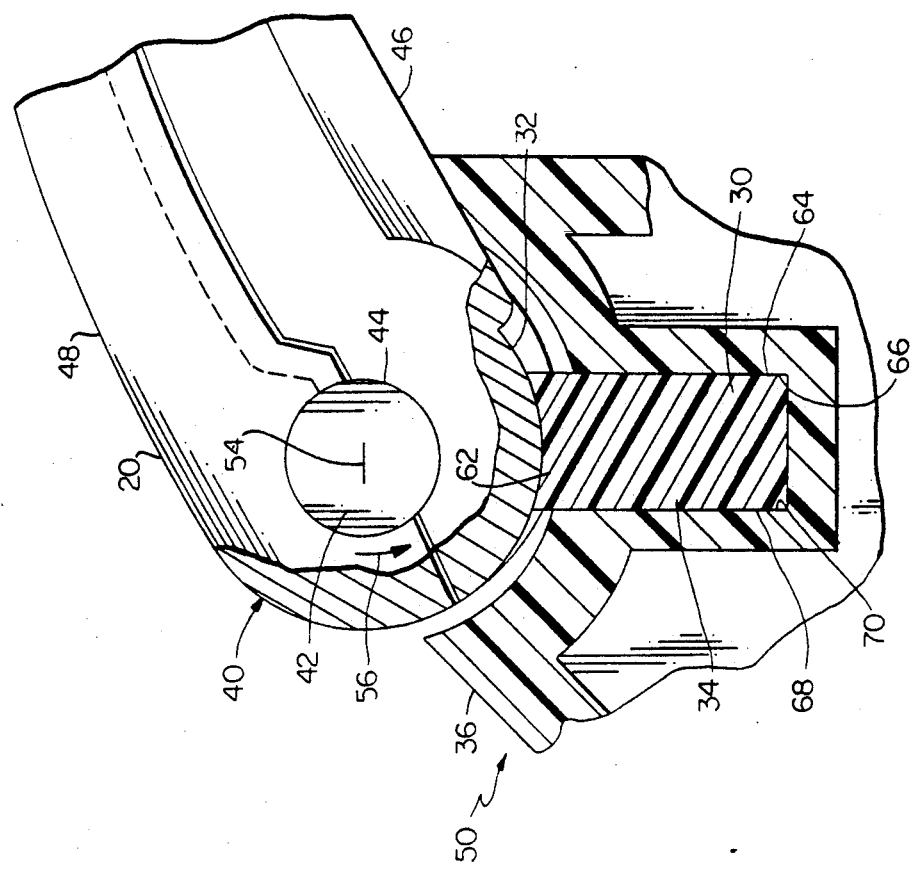
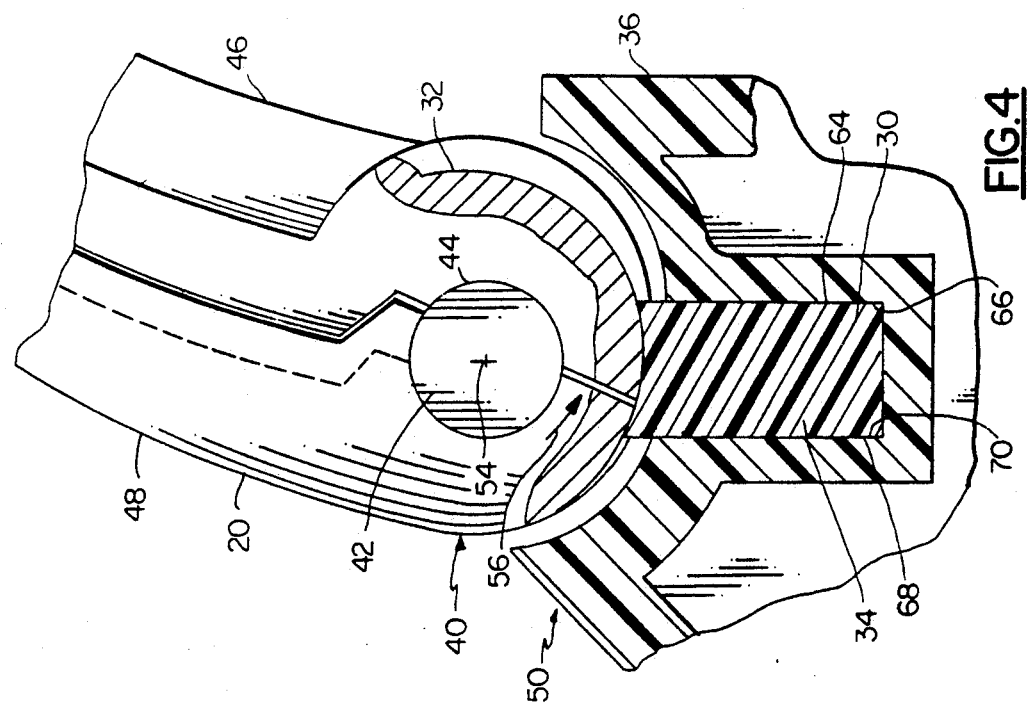

BRAKE MECHANISM FOR A PIVOTABLE CHARACTER DISPLAY

CROSS-REFERENCE TO RELATED APPLICATIONS

Reference is made to a co-pending application Ser. No. 589,141 entitled "Hinge For Use With Portable Electronic Apparatus" by Howard F. Sherman, filed concurrently with the present application and assigned to the same assignee as the present invention.

FIELD OF THE INVENTION

The present invention relates to character displays for electronic typewriters, personal word processors or portable computers and more particularly relates to brake mechanisms for pivoting character displays.

BACKGROUND OF THE INVENTION

Typically folding character displays for electronic typewriters, personal word processors or portable computers have been designed to cover the keyboard when placed in the down position. The brake mechanisms designed heretofore for the these types of displays have been designed to accommodate the specific needs of a flip-up display that covers the keyboard. To move the display from the down position covering the keyboard to an upright viewing position often involves a relatively large angle of movement. The displays are generally long enough to cover a large portion of the keyboard so the arm length is long and the proportioned lever type force from the weight of the display is relatively large. Brake mechanisms of this type include rachet type hinges and indexed position hinges as well as frictional force devices. Using frictional force brake mechanisms has advantages including continuous adjustment of viewing positions, smoother movement of the display and are less noisy than other types of brake mechanisms.

U.S. Pat. No. 4,730,364 entitled "Data Processor Flush Hinge Assembly" shows a hinge assembly that includes a brake assembly that holds the display in a desired position between 90°-180° relative to the down position of the display. A hinge assembly of this type would be useless for any display that did not need to be pivoted more than 90° relative to the down position of the display.

U.S. Pat. No. 4,781,422 entitled "Adjustable Clutch Mechanism" shows a pivotable display and clutch mechanism comprising a series of rings and a tension spring. The tension spring applies a constant pressure causing a frictional force between the rings thus holding the display in position The user must overcome this applied force while the screen is brought from a down position into a range of useful viewing positions, so a trade off exists between ease of movement of the screen for the user and adequate frictional force to hold the display. The mechanism is a delicate cooperation of a spring, bolts, nuts, spacers, and numerous rings and plates. It is easy to see how a brake mechanism with so many parts could wear easily and fail If the mechanism did fail it would be extremely difficult to fix and would make the computer extremely cumbersome and difficult to use.

U.S. Pat. No. 4,790,504 entitled "Display Support Mechanism" shows an disengageable brake mechanism for holding the display in a desired position. The brake mechanism comprises a lug portion which is turned to deform a socket portion of the display and thereby hold it in place. A brake mechanism of this type is cumbersome in that it requires the user to disengage the lug portion, set the display in a desired position and reengage the lug portion. It is not practical for frequent adjustment and repeated closing and opening of a flip up display.

SUMMARY OF THE INVENTION

It is, therefore, the primary object of the present invention to provide a brake mechanism for a continuously adjustable pivotable character display that does not cover the keyboard of the computer, personal word processor or typewriter, has a relatively small angle of movement and has a relatively short arm length.

It is a further object of the present invention to provide a brake mechanism for a continuously adjustable pivotable character display, wherein the brake mechanism varies the frictional force holding the display in position as the display is pivoted.

It is a further object of the present invention to provide a brake mechanism for a continuously adjustable pivotable character display, wherein the brake mechanism is inexpensive to manufacture and includes a minimum of parts.

It is a further object of the present invention to provide a brake mechanism for a continuously adjustable pivotable character display, wherein the brake mechanism is wear resistant and can be easily repaired if worn or damaged.

It is a further object of the present invention to provide a brake mechanism for a continuously adjustable pivotable character display, wherein the brake mechanism requires a minimum of effort and consideration of the user and at the same time provides the user with maximum possibilities of preferred display positions and holds the display in the desired position securely.

The teachings of the present invention include a brake mechanism for a pivotable article connected to a stationary object by a pivot hinge. The brake mechanism comprises a brake pad attached to a stationary object such that the brake pad applies a frictional force to the surface of the pivotable article that allows the pivotable article to be adjusted by the user yet is sufficient to hold the pivotable article in a position selected by the user.

The teachings of the present invention further include a brake mechanism for a continuously adjustable pivotable character display on an electronic typewriter, personal word processor or portable computer. The brake mechanism comprises a brake pad mounted on the typewriter and a cam located on the pivotable character display such that the display is continuously pivotable between a down position and an upright position and the cam varies the compression force on the brake pad and the frictional force between the cam and the brake pad as the display is pivoted. The frictional force between the brake pad and the display is sufficient to hold the display in a desired position between the down position and the upright position.

The brake mechanism may include an indentation in the housing of the typewriter such that the brake pad fits into the indentation snugly and is held in place primarily by the friction between two sides of the brake pad and two walls of the indentation. The brake pad may be capable of being removed and replaced. The cam may be shaped into the housing of the character display.

These and other objects, features and advantages of the present invention should become apparent from the following description when taken in conjunction with the accompanying drawings.

BRIEF DESCRIPTION OF THE DRAWINGS

FIG. 4 is a side view of a brake mechanism, taught by the present invention, for a continuously adjustable pivotable character display, wherein the display is in the upright position.

FIG. 5 is a side view of a brake mechanism, taught by the present invention, for a continuously adjustable pivotable character display, wherein the display is in the down position.

DETAILED DESCRIPTION OF THE PREFERRED EMBODIMENT

The preferred embodiment of the present invention is a brake mechanism for pivotable character displays for electronic typewriters, personal word processors or portable computers. However, it is anticipated that the teachings of the present invention could be used in numerous applications wherein a pivotable article is connected to a stationary object by a pivot hinge and a brake mechanism is desired. The brake mechanism of the present invention comprises a brake pad attached to a stationary object such that the brake pad applies a frictional force to the surface of the pivotable article that allows the pivotable article to be adjusted by the user yet is sufficient to hold the pivotable article in a position selected by the user.

Figure 1:
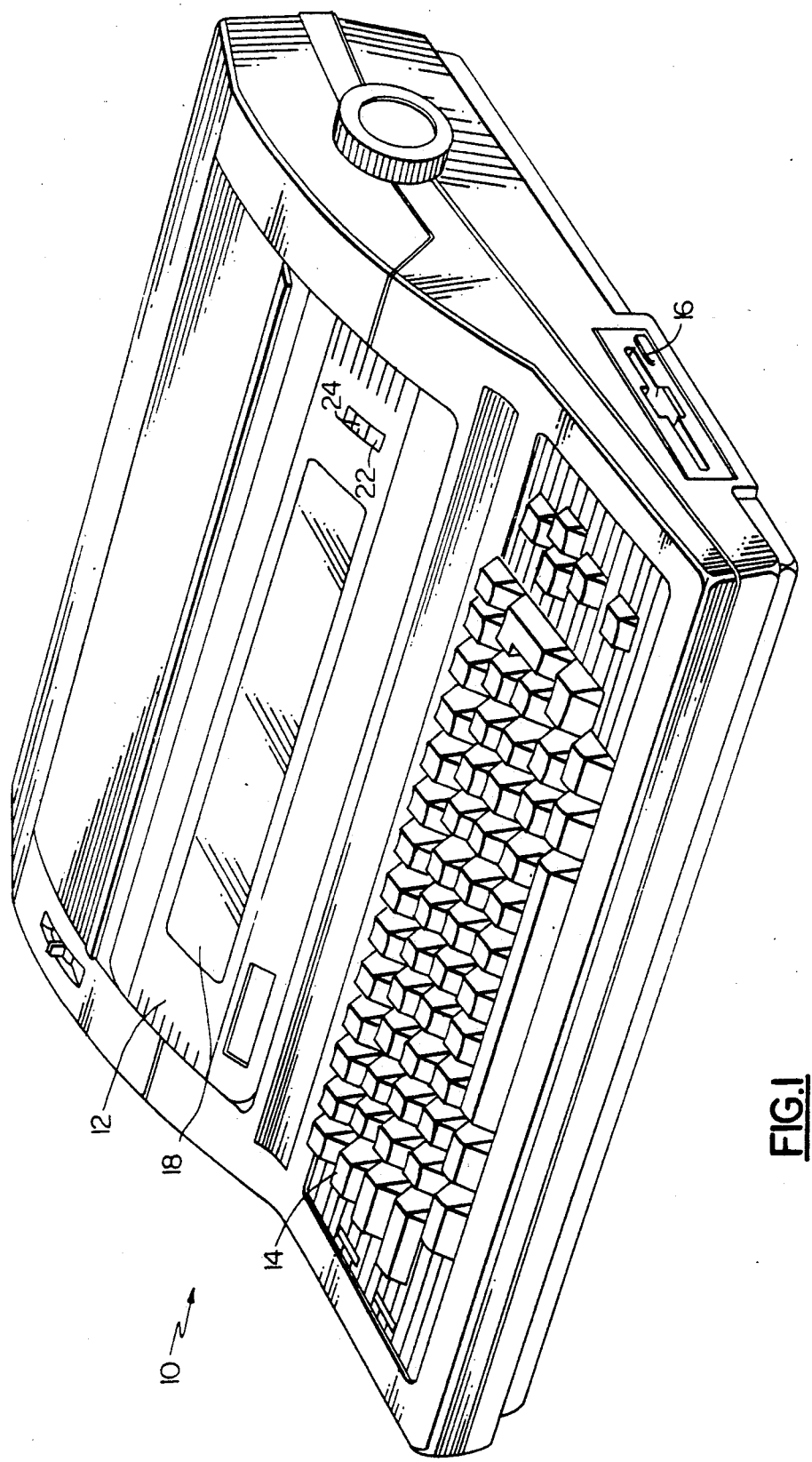
FIG. 1 is a perspective view of an electronic typewriter with a continuously adjustable pivotable character display that does not cover the keyboard of the computer or typewriter, has a relatively small angle of movement and has a relatively short arm length, wherein the display is in the down position.
Figure 2:
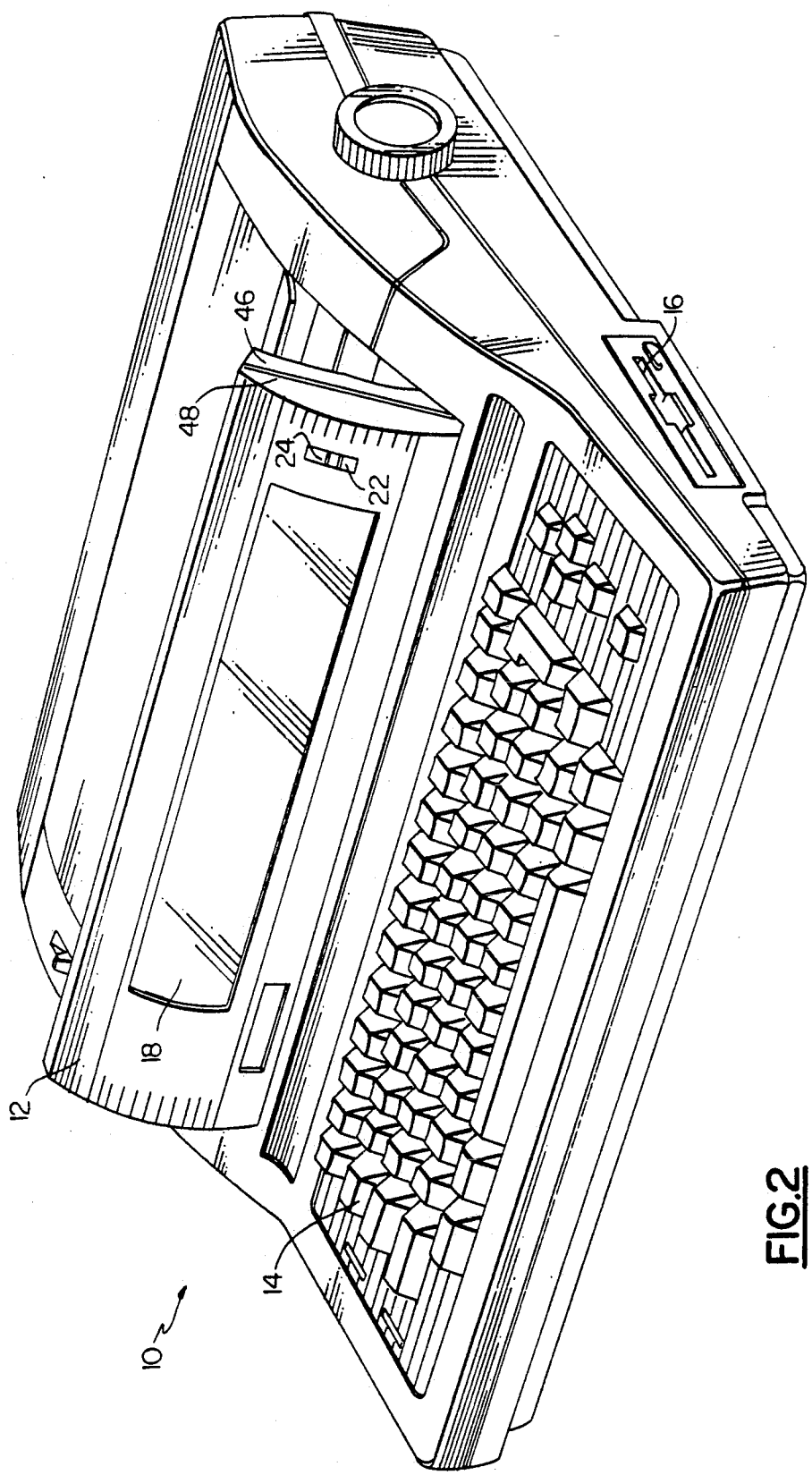
FIG. 2 is a perspective view of an electronic typewriter with a continuously adjustable pivotable character display that does not cover the keyboard of the computer or typewriter, has a relatively small angle of movement and has a relatively short arm length, wherein the display is in the upright position.

Referring to FIGS. 1 and 2, an electronic typewriter 10 is shown with a continuously adjustable pivotable character display 12. The display 12 does not cover a keyboard 14 of the computer or typewriter 10, has a relatively small angle of movement and has a relatively short arm length. A display of this types places different requirements on a brake mechanism than a typical display that covers the keyboard. The forces of motion during pivoting of the display 12 are less, because the angle of movement while pivoting is less and the arm length of the display 12 is shorter. Electronic typewriters are particularly suited to this type of display because full page viewing of text is often not required. However, word processors and computers could easily use these types of displays as well. The electronic typewriter 10 can include an electronic data storage means 16 for storing text files. The text can be seen in a screen 18 and can be edited while typing or reviewing stored files. The screen 18 is held in a screen housing 20 which may include cutouts 22 for screen control 24. The display 12 does not interfere with the insertion of paper and its passage through the typewriter during typing regardless of its position.

Figure 3:
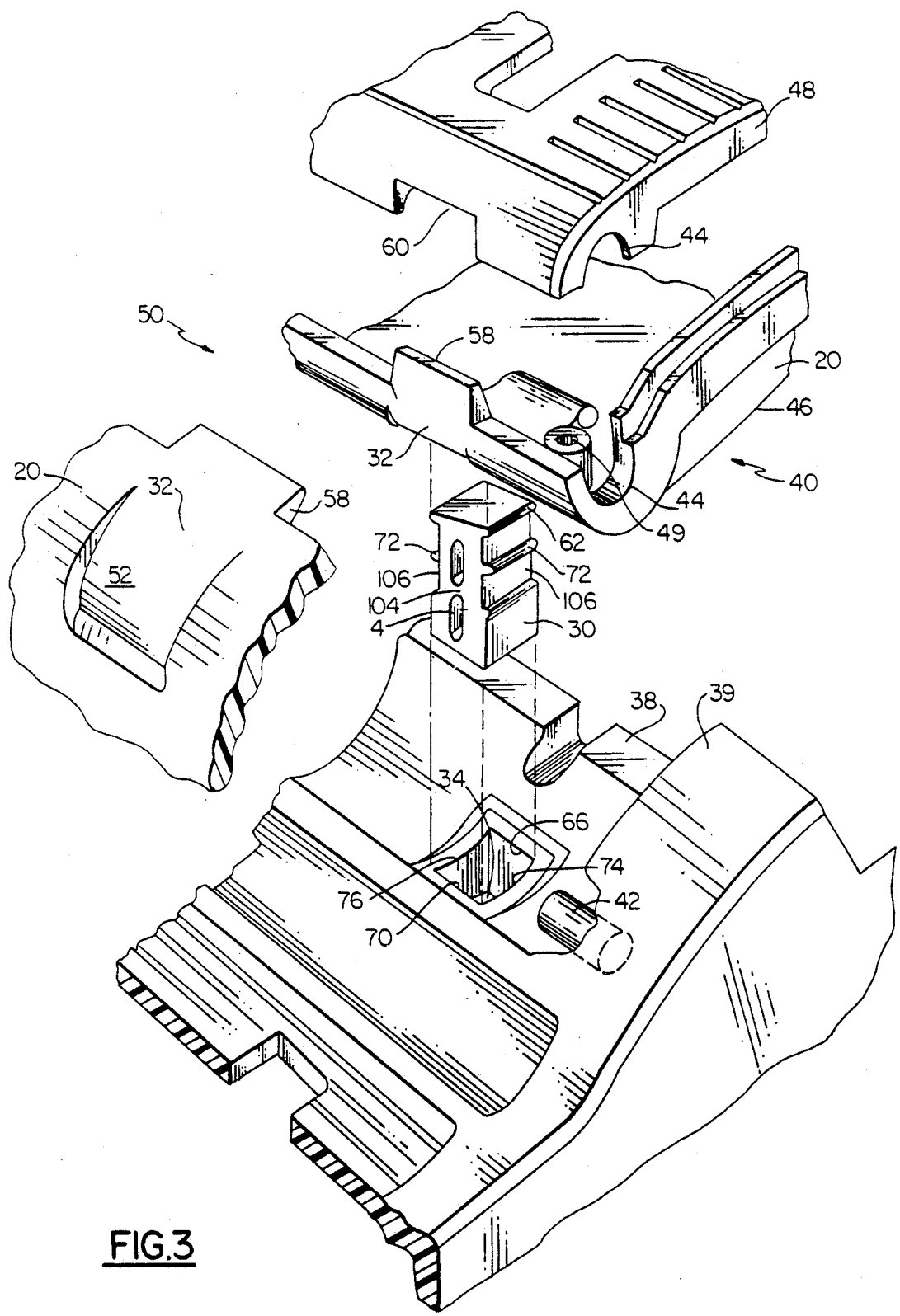
FIG. 3 is an exploded perspective view showing a combination of parts of a brake mechanism, taught by the present invention, for a continuously adjustable pivotable character display.

Referring now to FIG. 3, a brake pad 30 and an indentation in the display housing 20 forming a cam 32 is shown in accordance with the teachings of the present invention. The brake pad 30 may be held in a brake pad indentation 34 formed into the typewriter housing 36. The typewriter housing 36 may also include a display indentation 38 so that the top of the display 12 will lie flush with the top of the typewriter 10 when the display 12 is in the down position. A hinge 40 that allows the display 12 to be pivotable may be formed from a protrusion 42 in the typewriter housing 36 and an opening 44 in the display housing 20 such that the opening 44 allows the display 12 to pivot about the protrusion 42 smoothly without a great deal of play and without causing a great deal of friction While protrusion 42 and opening 44 are shown, it is anticipated that numerous types of pivot mechanisms are possible without departing from the teachings of the present invention.

The display housing 20 may be formed from a bottom arm 46 and a top arm 48. The arms 46 and 48 are held together by screws inserted through screw hole 49 in the bottom arm 46. The screen 18 would be placed inside along with any controls 24 and other parts that need to be inside the display housing 20. The two arms 46 and 48 are screwed together so that opening 44 would be formed around protrusion 42. As viewed in FIG. 2, the arms 46 and 48 of the display 12 have a relatively short length of less than six inches, since the display 12 has been designed not to cover the keyboard 14. This would mount the display 12 in place and allow it to pivot. The display 12 could be removed from the typewriter by separating the two arms 46 and 48 and easily repaired if needed.

A brake mechanism 50 in accordance with the teachings of the present invention is shown in operation in FIGS. 4 and 5. FIG. 4 shows the brake pad 30 in a slightly compressed state when the display 12 is in an upright position. FIG. 5 shows the brake pad 30 in a more compressed state when the display 12 is in the down position. This increased compression is accomplished by a camming surface 52 of the cam 32 which increases in distance from the pivot axis 54 of the protrusion 42 in the direction of the arrow 56. The frictional force between brake pad 30 and cam 32 will always be enough to hold the display 12 in any position between the fully upright position and the down position. However, a smaller frictional force will be applied, due to the slight compression of brake pad 30 by cam 32, as the display 12 is brought towards an upright position, since most of the gravitational force of the display 12 is substantially in vertical alignment with and supported by the pivot protrusion 42. It is anticipated that the display positions nearer the fully upright positions will be more desireable to the user. Therefore, the display 12 will be easier to move in the range of positions considered more likely to be desired by the user and slightly more difficult to move in the range of positions considered less likely to be desired by the user. When the display 12 is closer to the down position, the frictional force required to hold the display 12 is actually greater, as is the energy required by the user to overcome gravitational forces while pivoting the display, assuming that the typewriter is level. As viewed in FIGS. 4 and 5, the movement of the display 12 between the extreme upright position of FIG. 4 and the extreme down position of FIG. 5 results in a relatively small angle of less than 90°. This small angle is due to the display 12 being designed not to cover the keyboard 14.

The cam 32 as shown is formed directly into the bottom arm 46 of the display housing 20. The bottom arm 46 and cam 32 include a tab 58 and the top arm 48 includes a cutout 60 to create a place for tab 58 when the two arms 46 and 48 are attached. By adding tab 58 on bottom arm 46 along cam 32, the brake pad 30 will not slide over the seam of the two arms 46 and 48 as the display 12 is pivoted. This will reduce wear on the brake pad 30.

The brake pad 30 as shown can be formed of thermoplastic rubber like material and includes a flat head 62. When assembled, the head 62 is curved by the cam 32. The curvature of the contact surface of the head 62 corresponds to the curvature of the contact surface 52 of the cam 32 thereby creating a more even frictional force between the head 62 and cam 32. One flat side 64 of the brake pad 30 abuts against one wall 66 of the indentation 34. A second flat side 68 of the brake pad 30 abuts against a second wall 70 of the indentation 34. With this arrangement, the brake pad 30 remains stationary as the cam 32 moves relative to the brake pad 30 in both directions to further provide an efficient frictional force between the brake pad 30 and the cam 32. The brake pad 30 may also include ribs 72 to position it within the brake pad indentation 34. Walls 74 and 76 of the indentation 34 are slightly spaced away from the ribs 72 of the brake pad 30 to allow for expansion of the brake pad 30 during compression and to simplify inserting and removing the brake pad 30. The brake pad 30 can migrate toward and away from the walls 74 and 76 without affecting the frictional force between the brake pad 30 and the cam 32. Since the walls 74 and 76 are spaced from the ribs 72, the brake pad 30 could be formed as a solid pad without the ribs 72 and without slits 78. The brake pad 30 is also shown with the slits 78 which decrease the amount of rubber required to make the brake pad 30 and work together with the ribs 72 to optimize the compression characteristics of the brake pad 30.

The brake mechanism 50 of the present invention includes a minimum of parts and is extremely resistant to wear. However, if the brake pad 30 or the cam 32 does show extreme wear, the display 12 could be easily removed and the brake pad 30 could be replaced or raised by adding a suitable shim below the brake pad 30, thereby increasing the overall life of the system.

The foregoing description has been directed to particular embodiments of the invention in accordance with the requirements of the Patent Statutes for the purposes of illustration and explanation. It will be apparent, however, to those skilled in this art that many modifications and changes will be possible without departure from the scope and spirit of the invention. It is intended that the following claims be interpreted to embrace all such modifications.

What is claimed is:

1. A brake mechanism for a continuously adjustable pivotable character display on an electronic typewriter or portable computer, said brake mechanism comprising:

a) a brake pad mounted on said typewriter or computer; and
    b) a cam located on said pivotable character display such that said character display is continuously pivotable between a down position and an upright position and said cam decreases a compression force on said brake pad as said character display is brought towards an upright position and a frictional force between said cam and said brake pad is sufficient to hold said character display in a desired position between said down position and said upright position.

2. The brake mechanism of claim 1 wherein said character display does not cover the keyboard of said typewriter or computer when said character display is placed in said down position.

3. The brake mechanism of claim 1 wherein the pivoting of said pivotable character display comprises short angle movement of less than or equal to 90 degrees.

4. The brake mechanism of claim 1 wherein the pivoting of said pivotable character display comprises a short arm length of less than or equal to six inches such that the forces of motion while pivoting said character display are small.

5. The brake mechanism of claim 1 wherein means for securing said brake pad are included in the housing of said typewriter or computer.

6. The brake mechanism of claim 5 wherein said means for securing said brake pad in the housing of said typewriter or computer includes an indentation in the housing of said typewriter or computer such that said brake pad fits into said indentation snugly and is held in place by the walls of said indentation and the friction between said brake pad and the walls of said indentation.

7. The brake mechanism of claim 1 wherein said brake pad includes a curved brake pad face such that said face interacts with said cam to provide the greatest and most efficient frictional force between the surface of said face and the surface of said cam.

8. The brake mechanism of claim 1 wherein said cam is shaped into the housing of said character display.

9. The brake mechanism of claim 1 wherein said brake pad can be removed and replaced.

10. The brake mechanism of claim 1 wherein said brake pad includes slits therethrough and ribs to the outer sides of said brake pad to optimize compression of said brake pad and friction applied to said cam by said brake pad.

11. The brake mechanism of claim 1 wherein said brake pad includes ribs on the outer side portions of said brake pad and said ribs serve to properly position said brake pad.

12. The brake mechanism of claim 1 wherein said brake pad is composed of a rubber material.

13. A brake mechanism for a pivotable article connected to a stationary object by a pivot hinge such that said pivotable article is continuously pivotable between a down position and an upright position, wherein said brake mechanism comprises a brake pad attached to said stationary object such that said brake pad applies a frictional force to a cam surface of said pivotable article that allows the pivotable article to be adjusted by the user yet is sufficient to hold said pivotable article in a position selected by the user, and said cam surface of said pivotable article that contacts said brake pad is shaped such that a force of compression on said brake pad and a frictional force between said brake pad and said cam surface of said pivotable article decreases as said pivotable article is brought towards an upright position.

14. The brake mechanism of claim 13 wherein the pivoting of said pivotable article comprises short angle movement of less than or equal to 90 degrees.

15. The brake mechanism of claim 13 wherein the pivoting of said pivotable article comprises a short arm length of less than or equal to six inches such that the forces of motion while pivoting said pivotable article are small.

16. The brake mechanism of claim 13 wherein means for securing said brake pad are included in the stationary object.

17. The brake mechanism of claim 16 wherein said means for securing said brake pad in the stationary object includes an indentation in the said stationary object such that said brake pad fits into said indentation snugly and is held in place by the walls of said indentation and the friction between said brake pad and the walls of said indentation.

18. The brake mechanism of claim 13 wherein said brake pad includes a brake pad face such that said face is shaped to provide the greatest and most efficient frictional force between the surface of said face and the surface of said pivotable article.

19. The brake mechanism of claim 13 wherein said brake pad can be removed and replaced.

20. The brake mechanism of claim 13 wherein said brake pad includes slits therethrough and ribs to the outer sides of said brake pad to optimize compression of said brake pad and friction applied to said pivotable article by said brake pad.

21. The brake mechanism of claim 13 wherein said brake pad includes ribs on the outer side portions of said brake pad and said ribs serve to properly position said brake pad.

22. The brake mechanism of claim 13 wherein said brake pad is composed of rubber-like material.

23. A brake mechanism for a pivotable article connected to a stationary object by a pivot hinge such that said pivotable article is continuously pivotable between a down position and an upright position, wherein said brake mechanism comprises:
   a) an indentation in said stationary article;
   b) thermoplastic rubber filling said indentation forming a brake pad; and
   c) a cam surface of said pivotable article that comes into contact with said brake pad such that a force of compression on said brake pad and a frictional force between said brake pad and said cam surface of said pivotable article decreases as said pivotable article is pivoted towards an upright position that allows the pivotable article to be adjusted to the user yet is sufficient to hold said pivotable article in a position selected by the user.

24. The brake mechanism of claim 23 wherein the shape of said indentation and the shape of said brake pad optimize the compression of said brake pad and friction applied to said pivotable article by said brake pad.

* * * * *